(12) United States Patent
Johansson et al.

(10) Patent No.: US 7,799,386 B2
(45) Date of Patent: Sep. 21, 2010

(54) METHOD FOR PRODUCTION OF THERMALLY CURED COATINGS

(75) Inventors: Mats K. G. Johansson, Älvsjö (SE); Martin Svensson, Sollentuna (SE); Per-Erik Sundell, Borlänge (SE)

(73) Assignee: Svenska Lantmannen ek for, Stockholm (SE)

( * ) Notice: Subject to any disclaimer, the term of this patent is extended or adjusted under 35 U.S.C. 154(b) by 328 days.

(21) Appl. No.: 10/580,241

(22) PCT Filed: Nov. 25, 2004

(86) PCT No.: PCT/SE2004/001734

§ 371 (c)(1),
(2), (4) Date: May 22, 2006

(87) PCT Pub. No.: WO2005/052070

PCT Pub. Date: Jun. 9, 2005

(65) Prior Publication Data

US 2007/0117896 A1    May 24, 2007

Related U.S. Application Data

(60) Provisional application No. 60/524,860, filed on Nov. 26, 2003.

(30) Foreign Application Priority Data

Nov. 26, 2003    (SE)    .................................... 0303176

(51) Int. Cl.
*B05D 3/02*    (2006.01)
(52) U.S. Cl. ............... 427/385.5; 427/388.2; 427/388.5
(58) Field of Classification Search .... 427/388.1–388.5
See application file for complete search history.

(56) References Cited

U.S. PATENT DOCUMENTS 3,218,287 A * 11/1965 Schmidle et al. ............. 524/310
3,513,222 A * 5/1970 Hegnauer et al. ........... 427/386
3,840,448 A 10/1974 Osborn et al.
4,100,046 A 7/1978 Hodakowski et al.
4,426,227 A * 1/1984 Keeling et al. ........... 106/31.13
5,064,892 A 11/1991 Hofland et al.
6,025,032 A * 2/2000 Gaveske ................. 427/393.6
2002/0151629 A1 10/2002 Buffkin et al.
2003/0054103 A1* 3/2003 Sato et al. .................... 427/256
2004/0161542 A1* 8/2004 Ziemann et al. .......... 427/385.5

FOREIGN PATENT DOCUMENTS

| EP | 0 685 543 | 12/1995 |
| JP | 58049720 A | 3/1983 |
| WO | WO 97/31073 | 8/1997 |
| WO | WO 03064548 A2 | 8/2003 |

OTHER PUBLICATIONS

Samuelsson et al., "Synthesis and polymerization of a radiation curable hyperbranched resin based on epoxy functional fatty acids," *Progress in Organic Coatings*, vol. 50, 2004, pp. 193-198.
Enomoto et al., "Study of Reactive Diluent for Air-Dried Alkyd Paint," *Journal of Applied Polymer Science*, vol. 22, 1978, pp. 253-265.
Muizebelt et al., "Crosslink mechanisms of high-solids alkyd resins in the presence of reactive diluents," *Progress in Organic Coatings*, vol. 40, 2000, pp. 121-130.
Australian Office Action, dated Jul. 1, 2009, issued in corresponding Australian Patent Application No. 2004293740.

* cited by examiner

*Primary Examiner*—Erma Cameron
(74) *Attorney, Agent, or Firm*—Young & Thompson

(57) ABSTRACT

Method for production of a coating on a solid substrate comprising the steps of applying a liquid coating composition comprising a polyfunctional resin, a fatty acid or derivative thereof acting as a reactive diluent and optionally a curing agent and/or one or more additives, wherein the resin comprises functional groups capable of reacting with carboxyl or acyl groups of the fatty acid or derivative thereof, onto the substrate, and curing the coating by heat activation. The invention further relates to the liquid coating composition as well as a substrate comprising a coating obtained by heat activation of such a coating composition.

23 Claims, No Drawings

METHOD FOR PRODUCTION OF THERMALLY CURED COATINGS

FIELD OF INVENTION

The present invention relates to the use of fatty acids and derivatives thereof for the production of thermally cured coatings. In coating procedures according to the present invention the amount of volatile organic solvents in the coating compositions can be reduced considerably with lower costs as well as improved environmental performance of the coating. The fatty acid or derivative functions as a reactive diluent; initially as a solvent by reducing the viscosity and allowing the coating to be applied as a liquid onto the substrate. Subsequently, the diluent is incorporated into the final coating film by a chemical reaction between the carboxyl or acyl group of the diluent and suitable groups on the resin. The fatty acid derivative may also be used to adjust the mechanical properties of the coating i.e. be incorporated as a flexibilizer in the thermoset coating. The invention furthers relates to coating compositions comprising fatty acids or derivatives thereof as well as substrates with coatings obtained by heat curing of such coating compositions.

BACKGROUND OF THE INVENTION

Thermally cured coatings are increasingly used industrially, particularly in the rapidly growing pre-coated sheet metal industry. The steel coils are coated with one or more coating layers and sold as pre-coated sheet metal to building, OEM and transportation industry. One layer of the coating system is often a thermally cured organic coating applied with roller application techniques. The application is normally performed with a liquid coating to form a wet-film, which then is cured thermally in a convection oven. One of the major drawbacks with this technique is that large quantities of organic solvents are needed to reduce the viscosity of the coating so it can be applied on the coil. The solvent is then evaporated during the drying and fumes incinerated to avoid solvent emissions. The use of solvents is not only an environmental problem, but does also add a significant cost to the coating since it must be taken care of in one-way or another. A significant improvement would be obtained if instead the solvent could be incorporated into the final dry coating. The same reasoning as above can also be applied to other thermally cured organic coatings where solvents are used to adjust the viscosity.

The demands on a reactive diluent can be listed as follows:
Good solvency of the intended resin system.
Low viscosity.
Low volatility.
The diluent should have a reactive group that allows it to be incorporated into the dry film.
The reactive diluent should react under the intended curing conditions (temperature, atmosphere, cure speed, etc.)
The reactive diluent should not introduce inappropriate physical properties to coating for the intended application.

One group of monomers/molecules that have a long history in organic coatings is vegetable oils and derivatives thereof (Derksen et al). These monomers are traditionally used in air drying coating where unsaturations in the fatty acids react via an oxidation reaction to form a thermoset network. Examples of these air-drying systems are linseed oil coatings and air-drying alkyds. Other fatty acid systems are based on other functional groups such as hydroxyl groups in castor oil.

The use of fatty acid esters as reactive diluents in order to reduce or completely replace the volatile organic solvents in coatings has been described previously in many patent applications.

In EP 685543 DE 3803141, DE 3701410 esters of unsaturated fatty acids and various alcohols are used as reactive diluents. In DE 4129528 and EP 357128 the reactive diluents consist of fatty acid esters of various unsaturated alkyl ether alcohols. EP 305007 and EP 305006 employ an ester consisting of both an unsaturated fatty acid and unsaturated alcohol moiety as a reactive diluent. GB 2190672 use a reactive diluent that combines unsaturated fatty acids with unsaturated allyl polyols in an ester. Although these reports claim the use of reactive diluents in a multitude of binder and resins systems, in all these cases the incorporation of the reactive diluent is obtained via a reaction of unsaturated bonds in the diluent with the binder and the diluent molecules. The reaction is typically cured by air-drying.

In DE 19533168 and U.S. Pat. No. 4,877,838 the reactive diluents consist of esters containing reactive epoxide groups either in the fatty acid or the alcohol moiety. In these cases the reaction of the diluent with the coating system is a ring-opening reaction between the diluent and reactive hydroxyl groups in the resin and the diluent.

In U.S. Pat. No. 4,477,534 the resin contain unsaturated fatty acid esters and the reactive diluent an air drying vinyl oxazoline ester. The diluent reacts in air with the unsaturated bonds in the resin.

Fatty acid derivatives have also been reported in several patents related to heat-curable coatings. In JP 09137078, esters of unsaturated conjugated fatty acids and polyhydric alcohols are used a base for paints that claims to be heat or light curable. The curing takes place by the reaction of the unsaturated fatty acid groups. Similarly, in BE 805300 unsaturated fatty acid groups are used in the binder. The curing takes place at an elevated temperature through the reaction between the unsaturated fatty acids.

Several inventors report the use of fatty acid esters in epoxy resins in heat curing systems. JP 08325509 use a thermosetting water-dispersible epoxy resin containing fatty acids and P-bonded hydroxyl groups to obtain a coating suitable for metals. JP 63248869 use an epoxy resin obtained by reacting epoxy compounds with fatty acids. The resin is suitable for printing on metals. In both these reports the fatty acid is incorporated in the resin before application on the surface. The curing takes place via radical polymerisation of unsaturated prepolymers in the resin and amine-containing hardeners. U.S. Pat. No. 4,962,179 reports a different approach using epoxide modified fatty acid in the form of epoxidised vegetable oils. The coating cures upon heating through the reaction between epoxide group of the fatty acid with amines in the coating formulation.

In DD 257442 the solvent content of the coating is reduced by modifying the alkyd binder with a dicyclopentadiene fatty acid ester derivative. In U.S. Pat. No. 4,100,046 the cycloalkenyl group is added to an fatty acid to obtain a heat-curable binder. In both these report the fatty acid is incorporated in the resin prior to application and not used as diluent in the system. The curing reaction takes place by the reaction of unsaturated cycloalkenyl groups.

In JP 2000212483 a polyglycerin ester of fatty acids is added to an aqueous paint. The ester does not reduce the viscosity (i.e. act as a diluent) or take part in the curing of the coating.

Fatty acid esters have also been used in heat curable powder coatings. In NL 1009254 unsaturated fatty acid ester is used to improve adhesion and appearance after curing. In JP 06345822 a fluorine powder resin contains esters of fatty acid and unsaturated vinyl alcohol. In neither of these examples the fatty acid ester act as a diluent since the coatings are solids and not liquids.

These examples demonstrate the need to find ways of reducing the use of solvents in coatings. It also shows the great interest in fatty acid esters as an ingredient in the pain formulations. When fatty acids are used as the reactive part of the formulations it is either as unsaturated compounds capable of curing with the air, or as epoxides reacting with other components in the formulation.

SUMMARY OF THE INVENTION

The concept of the invention is to replace or at least considerably reduce the amount of evaporating solvents in thermally cured liquid coatings by using a fatty acid or fatty acid derivative as reactive diluents.

The present invention employs a significantly different reaction to previously described systems when fatty acid derivatives have been used as reactive diluents. The present invention describes the use of the carboxyl or acyl group of a fatty acid ester or a derivative thereof, as the reactive site when the diluent is reacted into the network. The fatty acid derivative is preferably an amide, an anhydride or an ester, in particular an alkyl ester, of a fatty acid. The carboxyl or acyl group is reacted chemically with the coating resin to form an integrated part of the dry film. Chemical reactions involving carboxylic acid or esters thereof are very suitable for thermally activated curing and a high reaction rates can be obtained at high temperatures.

Fatty acid derivatives have a long history in coatings and the incorporation of them into coating resins via esterification/transesterification is well documented. The use of these reactions is however always performed during the resin synthesis in chemical reactors. The present invention employs analogous chemistry, but with the difference that this reaction is performed after that the coating formulation has been applied as a thin film on a substrate. This allows the fatty acid derivatives to be used as a viscosity reducer in the coating formulation, thus reducing the need for conventional solvents.

Previous described inventions using fatty acid derivatives as reactive diluents all employ other functional groups and drying mechanisms than the reactions presented in this invention.

The most common way is to use unsaturated fatty acids, which react with atmospheric oxygen under ambient conditions to form a dry film (e.g. in EP 685543). This is normally called "air-drying" coatings. This approach is limited to unsaturated fatty acids where the alkene group in the fatty acid makes an oxidative crosslinking possible. The presence of atmospheric oxygen is also necessary for the curing. Air-drying is normally considered to be a rather slow curing process not suitable for industrial coatings where a high processing rate is of importance.

Reactive diluents based on fatty acids with other functional groups have also been described previously in thermally and radiation curable systems. These are for example fatty acids with either hydroxy-, epoxy or acrylate groups attached to the carbon chain of the fatty acid. Hydroxyfunctional fatty acids exist in for example castor oil where the hydroxyl group is situated on the 12th carbon on ricinoleic acid. Epoxy groups are normally introduced by oxidation of alkene groups in unsaturated fatty acids and acrylates by chemically modifying the hydroxy group on ricinoleic acid. Reactive diluents based on these structures can be used in coating systems but several drawbacks exist compared to the present invention.

Fatty acids are normally present as mixtures where a fraction of the fatty acids have the functional group possible to chemically react with the intended curing reaction. Unreacted fatty acid derivatives may migrate to the coating surface and cause changes in properties with time. This is valid for all aforementioned reactive diluents based on fatty acid derivatives with reactive groups present on the carbon chain, but not for the present invention since all reactive diluents according to the invention contain a carboxyl or acyl functional group. A chemical conversion, such as acrylation, is furthermore normally accompanied with an increase in molecular weight and polarity which both increases the viscosity. One purpose of a reactive diluent is to reduce the viscosity of the system to allow the paint to be applied as a thin film on a substrate why this is a negative side-effect of these systems. The present invention is based on reactive diluents that do not suffer from this drawback.

Advantages of the present invention can be summarized as follows:

All fatty acid alkyl esters contain a reactive group i.e. mixtures of fatty acids can be used while retaining a functionality of one. The risk of unreacted fractions of fatty acids in the coating is therefore strongly reduced.

The alkyl esters are preferably monofunctional and can only be reacted with the polyfunctional resins, thus, all of the diluent contribute to produce a thermoset network. The use of triglycerides changes this but the viscosity is also higher in this case.

The reactive diluent can be reacted with any coating resin having a functional group that is reactive towards a carboxylic acid or ester thereof.

The reactivity is suitable for coating systems cured thermally at high temperatures and short time, since esterifications/transesterifications can be very rapid at high temperatures.

Alkyl fatty acids have low viscosity and low volatility making them suitable as viscosity reducers for liquid coatings.

The fatty acid derivative could furthermore be used to adjust the flexibility of the coating.

Atmospheric oxygen does not affect the described curing reaction.

DETAILED DESCRIPTION OF THE INVENTION

The invention is based on two or optionally three film forming components A, B, and C that together can be formulated to a thermally curable liquid coating. Component A is a polyfunctional coating resin capable of forming a thermoset either by itself or together with a curing agent, B, upon heat activation. Examples of such resins (component A) are alkyd resins, polyester resins, polyacrylate resins or polymethacrylate resins with either hydroxyl, carboxylic acid or epoxy functional groups suitable for crosslinking reactions. Phenolic and amino resins are other examples. The curing agents (component B) are typically amino compounds such as hexamethoxymetylolmelamine or epoxyfunctional curing agents such as bis-phenol-A-diglycidyl ether or triglycidylisocyanurate (TGIC). Other curing agents could be phenolic-, hydroxyl-, amine-, carboxylate, or isocyanate-functional crosslinkers capable of reacting with the component A. Component C is a reactive diluent capable of reacting with A and/or B to form an integrated part of the dry film upon heat activation. Component C is a, saturated or unsaturated, fatty acid or fatty acid derivative, in particular an ester, anhydride or amide, where the carboxyl group is the functional group capable of reacting with component A and/or B. In addition to the carboxylic or acyl groups used for reactions according to the present invention component C might contain other functional groups participating to some extent in the reaction with other components in the composition. At room temperature component C is a liquid, has a low viscosity and is not volatile. The function of C is to reduce the viscosity of the coating so it can be applied as a liquid coating onto a substrate with reduced amount of conventional organic solvents that evaporate upon drying. The demand on low viscosity limits the carbon chain length of the fatty acid to maximum 22 carbons. The ester could either be a monofunctional ester, such as an alkyl ester, e.g. a methyl, isopropyl, ethyl ester, or a polyfunctional ester, such as a glycerol ester, of fatty acids.

The coating is formulated in appropriate ratios of components A, B, and C together with other components such as co-solvents, pigments, catalysts, and other additives, including solid particles, to form a wet-paint with a viscosity suitable for wet-film application such as roller application. Components A, B and C should be selected so that phase separation is avoided during the curing process. In a preferred embodiment of the invention a resin of a relatively high functionality (OH>3 mol/mol) and yet a low polarity is used as component A and rapeseed oil methyl ester (RME) used as component C. The coating is then applied on to a substrate and cured by heat activation. Suitable substrates for the coating are any material that can sustain a heat activated curing. A typical substrate is a metal surface, optionally pretreated e.g. with zinc or phosphate, in order to introduce corrosion resistance as well as the desired adhesive properties. Such an example is surface modification of a steel coil, which is coated with a coating composition, using a roller applicator, and cured at temperatures above 200° C. A preferred oven temperature at present is at least 100° C., more than 200° C. and in particular higher than 250° C. A preferred way of using the invention is in coil-coating of steel sheet performed in an oven having an air-temperature of 300° C., and at a maximum substrate temperature of 240° C. However, the temperature required in a specific application will depend on the catalyst present in the composition as well as how long said composition is subjected to the curing conditions. This can easily be determined by the skilled person in a given situation.

The curing temperature and time has to be selected so that volatility of component C at this temperature is not significant. As an example, the volatility of RME was assessed both by itself (neat) and as a part of a coating formulation while slowly increasing the temperature (up to 300° C.). At the typical substrate temperature (240° C.) 23% of the neat RME had evaporated. At 300° C. all of the neat RME had disappeared, but only 50% of the RME in the formulated product. The amount of component C that evaporates depend on the relative rate of reactivity with the resin (component A) and the atmosphere, as well as the phase stability of the formulation and the volatility. A fast reaction with the resin prevents evaporation. Fast reactions can be achieved by the use of catalysts, higher functionality on the resin and a better phase contact between the components in the formulation. When the same measurements were repeated in a nitrogen atmosphere similar values were obtained. This indicates that under these conditions the RME is not incorporated primarily through oxidative reactions as described in EP 685543, DE 3803141, DE 3701410, etc. In addition, a saturated ester (methyl stearate) was used instead of RME. This ester cannot undergo oxidative reactions, but still displayed an incorporation in the final film to a similar extent as mixtures with RME.

The incorporation of the fatty acid derivative was also noticed in the change of coating properties. Formulations with increasing amount of RME was applied on steel surface and cured under normal curing conditions (air temperature of 300° C., 37 seconds, final substrate temperature of 240° C.). The films obtained in this way showed a drop in Tg from 45° C. to 35° C. as the amount of RME added was increased from 0 to 10%. To ensure that the RME was not present as unreacted product, the films were extracted with hexane and the extract weighed and analysed for fatty acid methyl esters. The differences in the amount extracted from coatings free from RME and those containing up to 15% RME, showed that only ca. 10% of the diluent had not reacted with the film. An even lower amount of unreacted ester could be achieved by choosing different catalysts, resins or curing conditions.

At this stage best results have been obtained with a coating composition, wherein the resin is a hydrofunctional polyester with a functionality of at least 3 OH, the curing agent a hexamethoxymethyl melamine, and the reactive diluent a methyl ester of rapeseed oil. The coating composition was applied to a steel surface and curing carried out at 300° C. for 37 seconds.

Accordingly the inventions in a first aspect relates to a method for production of a coating on a solid substrate comprising the steps of applying a liquid coating composition comprising
    a polyfunctional resin, a fatty acid or derivative thereof and optionally a curing agent and/or one or more additives,
    wherein the resin comprises functional groups capable of reacting with carboxyl or acyl groups of the fatty acid or derivative thereof,
onto the substrate, and
curing the coating by heat activation.

Further the invention relates to a solid substrate having a coating produced according to a method comprising the steps of applying a liquid coating composition comprising
    a polyfunctional resin, a fatty acid or derivative thereof and optionally a curing agent and/or one or more additives,
    wherein the resin comprises functional groups capable of reacting with carboxyl or acyl groups of the fatty acid or derivative thereof,
onto the substrate, and
curing the coating by heat activation In one embodiment of the invention the coating produced on a substrate is released from the substrate whereby a thin film is formed. In this case the substrate surface and the cured coating has difference in surface energy that prevents adhesion to the surface, while the cohesion in the film is strong enough to prevent rupture as it is released from the substrate.

According to a further aspect of the invention a liquid coating composition is provided, capable of curing by heat activation. The composition comprises
    a polyfunctional resin, a fatty acid or derivative thereof and optionally a curing agent and/or one or more additives,
    wherein the resin comprises functional groups capable of reacting with carboxyl or acyl groups of the fatty acid or derivative thereof.

EXAMPLES

Example 1

Materials

A. Hydroxyfunctional polyester:
Acid value: 8 mg KOH/g resin, 0.14 mmol acid/g resin Hydroxyl value: 121 mg KOH/g resin, 2.15 mmol OH/g resin
Tg: −6° C.
Molecular weight, Mn: 1530 g/mol
70% dry content (w/w), solvent: Solvesso 100 (CAS-nr: 64742-95-6,
branched backbone
Functionality (mole/moles resin): 3.3 OH, 0.2 acid
Supplied by: Akzo Nobel Nippon Paint AB, Gamlebyn, Sweden B. Hexamethoxy methyl melamine (HMMM):
$C_{15}N_6O_6H_{30}$
Molecular weight: 390 g/mol
Functionality: 6
Supplied by: Akzo Nobel Nippon paint AB C1. Fatty Ester Methyl Esters (FAME):
$C_{19}O_2H_{36}$, (Rape seed oil methyl ester, Methyl oleate, methyl stearate etc.)
Molecular weight: 296 g/mol
Functionality: 1
Supplied by Svenska Lantmännen, Tradename: RME C2. Fatty Ester Methyl Esters (FAME):
$C_{19}O_2H_{38}$, (methyl stearate)
Molecular weight: 298.5 g/mol
Functionality: 1
Purchased by Lancaster.
Catalyst: p-dodecyl benzyl sulphonic acid (DDBSA)

Mixture 1

| | | |
|---|---|---|
| A. polyester mixture (70% dry content) | 121.4 g | 183.3 mmol OH |
| B. HMMM | 15 g | 230.8 mmol methylol |
| C1. RME | 0 g | 0 mml |
| DDBSA | 1.36 g | |
| Total | 137.76 g | (73.6% dry content) |

Mixture 2
As mixture 1 but 5 g (16.9 mmol ester) of C1 (RME) added.

Mixture 3
As mixture 1 but 10 g (33.8 mmol ester) of C1 (RME) added.

Mixture 4
As mixture 1 but 15 g (50.7 mmol ester) of C1 (RME) added.

Mixture 5
As mixture 1 but 6 g (20.1 mmol ester) of C2 (MSt) added.

Application and Curing
The mixture was applied on a steel substrate (0.6 mm thick) with a 16 µm wire bar applicator to give a dry film thickness of 10 µm. The coating was then cured for 37 second in an oven at 300° C. and then rapidly cooled in cold water. A peak metal temperature (PMT) of 241° C. was obtained for the coating. The final coating had high gloss, good adhesion, and pencile hardness H. The coating from mixture 4 was slightly yellowed contrary to the films from mixture 1-3 and 5, that showed no yellowing These properties were comparable to the properties of a coating prepared using volatile organic solvents instead of FAME.

Testing of Mechanical Properties
The mechanical properties were determined with a TA-instrument DMA Q800 on free-standing films in tensile mode. Free-standing films were obtained by cutting strips of the coatings and removing them from the metal sheet with a scalpel. The tensile modulus and glass transition were determined for cured films based on mixtures 1-3. The Tg's as determined by the onset of drop in modulus were 45, 35, 30° C. for films from mixtures 1, 2, and 3 respectively. This shows that an increasing amount of RME softens the films and shifts the Tg's to lower values and that the amount of RME can be used as a tool to adjust the Tg of the cured coating.

Assay of Unreacted FAME in Coating
Strips of the coatings were extracted with n-hexane. The extract was evaporated and the residue recovered. The amount of extract was very low, approx 0.1 mg/mg coating. The extract was analysed using gas-chromatography to identify unreacted FAME and fatty acids. In Table 1 the amount of FAME and fatty acids as percent (w/w) of coating strip is presented.

TABLE 1

| Coating from formulation | FAME + fatty acids |
|---|---|
| Mixture 1 | 0.2% |
| Mixture 2 | 0.6% |
| Mixture 3 | 1.3% |
| Mixture 4 | 0.3% |
| Mixture 5 | 0.6% |

The amount indicates that ca 10% of the FAME in the formulation is unreacted.

Example 3

In order to ascertain that the FAME was not lost through evaporation during the curing process, the weight loss was monitored during heating using Thermal Gravimetric Analysis (TGA). In this set-up the temperature increase and air convection from the real coil coating conditions could not exactly be copied. In the instrument the temperature was increased from 30° C. to 300° C. at a rate of 20° C./minute, the sample was subsequently left for 5 minutes at 300° C. A slow stream of air or nitrogen was passed over the sample. An aliquot of approximately 30 mg of the formulation was placed in an alumina cup with a surface area of 1.5 mm².
Mixtures 1 to 4 as in Example 1.
Mixture 6: As mixture 1 but 10 g (33.5 mmol ester) of C2 (MSt) added.
The weight loss recorded is due to several processes: (i) evaporation of the solvent in the polyester, (ii) thermal breakdown of the polyester, (iii) evaporation of the FAME. In Table 2 the weight loss (as % w/w of the total mixture) after subtraction of the loss attributable to the solvent is presented:

TABLE 2

| Formulation | Weight loss 240° C. | Weight loss 300° C. |
|---|---|---|
| Mixture 1 | 0.1% | 6% |
| Mixture 2 | 2.0% | 10% |
| Mixture 3 | 1.7% | 10% |
| Mixture 4 | 2.4% | 12% |
| Mixture 6 | 3.6% | 10% |
| Neat RME | 23% | 99% |

These measurements indicate that at 300° C. neat RME has evaporated completely from the metal surface. In formulation with polyester approximately 50% of the RME remain in the coating at this temperature. At 240° C., which is the typical PMT for coil coating, approximately 75% of the RME remains in the formulation.

In Table 3 the weight loss (as % w/w) at curing in nitrogen atmosphere after subtraction of the loss attributable to the solvent is presented:

TABLE 3

| Formulation | Weight loss 240° C. | Weight loss 300° C. |
|---|---|---|
| Mixture 1 | 1.3% | 6% |
| Mixture 2 | 1.0% | 7.5% |
| Mixture 3 | 3.5% | 16% |
| Mixture 4 | 4.5% | 13% |
| Mixture 6 | 3.1% | 10% |
| Neat RME | 23% | 99% |
| Neat MSt | 10% | 34% |

The differences to between the measurements in nitrogen and air are very small indicating that oxidative reactions are not a predominant way for the FAME to be incorporated in the film.

Example 3

Materials

A. Hydroxyfunctional polyester:
Acid value: 8-12 mg KOH/g resin => 0.14 mmol acid/g resin
Hydroxyl value: 120 mg KOH/g resin => 2.14 mmol OH/g resin
Tg: −6° C.
Mn: 2500 g/mol
60% dry content (w/w), solvent: xylene
Branched backbone
Functionality: 5.3 OH, 0.5 acid
Supplied by: Beckers Industrial Coatings B. Hexamethoxy methyl melamine (HMMM):
$C_{15}N_6O_6H_{30}$
Molecular weight: 390 g/mol
Functionality: 6
Supplied by: Beckers Industrial Coatings C3. Fatty Ester Methyl Esters (FAME):
$C_{19}O_2H_{36}$, (methyl linoleate, methyl oleate etc.)
Molecular weight: 296 g/mol
Functionality: 1
Supplied by Svenska Lantmännen, Tradename: Linutinâ
Catalyst: Sulphuric acid Composition

| | | |
|---|---|---|
| polyester mixture (60% dry content) | 7.55 g | 9.7 mmol OH |
| HMMM | 1.25 g | 19.2 mmol methylol |
| FAME | 0.52 g | 1.76 mmol ester |
| Catalyst | 0.024 g | |
| Total | 9.34 g | (67.7% dry content) |

Application and Curing

The mixture was applied on a chromated steel substrate (0.6 mm thick) with a 16 μm wire bar applicator to give a dry film thickness of 10 μm. The coating was then cured for 37 seconds in an oven at 300° C. and then rapidly cooled in cold water. A peak metal temperature (PMT) of 241° C. was obtained for the coating. Final FAME content in the coating was approximately 8% (w/w). The final coating had high gloss, good adhesion, no yellowing, and pencile hardness H. These properties were comparable to the properties of a coating prepared using volatile organic solvents instead of FAME.

REFERENCE

Derksen, J. T. P., F. P. Cuperus, and P. Kolster, Renewable resources in coatings technology: a review. Progress in Organic Coatings, 1996. 27(1-4): p. 45-53

The invention claimed is:

1. A method for production of a coating on a solid substrate, said method comprising the steps of:
applying a non-aqueous liquid coating composition onto the substrate, said non-aqueous liquid coating composition comprising a polyfunctional resin, a fatty acid derivative that is an acyl-group containing monofunctional or polyfunctional alkyl esters, a catalyst, optionally a curing agent and optionally one or more additives, wherein the polyfunctional resin comprises functional groups that react with acyl groups of the fatty acid derivative, and
curing the liquid coating composition by heat activation.

2. The method according to claim 1, wherein the polyfunctional resin is an alkyd, a polyester, polyacrylate, polymethacrylate, phenolic, or amino resin.

3. The method according to claim 2, wherein the curing agent is an epoxy functional compound, a phenolic functional crosslinker, a hydroxyl functional crosslinker, an amine functional crosslinker, a carboxylate functional crosslinker, or an isocyanate functional crosslinker.

4. The coating composition according to claim 3, wherein the curing agent is (1) an amino compound that is hexamethoxymethylmelamine, or (2) an epoxyfunctional compound that is bisphenol-A-diglycidyl ether or triglycidylisocyanurate.

5. The method according to claim 1, wherein the curing agent is an epoxy functional compound, a phenolic functional crosslinker, a hydroxyl functional crosslinker, an amine functional crosslinker, a carboxylate functional crosslinker, or an isocyanate functional crosslinker.

6. The method according to claim 5, wherein the curing agent is (1) an amino compound that is hexamethoxymethylmelamine, or (2) an epoxy functional compound that is bisphenol-A-diglycidyl ether or triglycidylisocyanurate.

7. The method according to claim 1, wherein the fatty acid derivative has a carbon chain length of not more than 22 carbon atoms.

8. The method according to claim 1, wherein the substrate is a metal surface optionally pre-treated to be corrosion resistant and adhesive to the coating composition.

9. The method according to claim 8, wherein the metal surface is steel.

10. A solid substrate having a coating produced according to the method of claim 1.

11. The method according to claim 1, wherein the fatty acid derivative is (1) a monofunctional alkyl ester that is methyl, or (2) a polyfunctional alkyl ester that is glycerol ester.

12. The method according to claim 1, wherein the liquid coating composition is cured by heat activation at a temperature of 200° C. to 300° C. and for a time of 37 seconds to 5 minutes.

13. The method according to claim 1, wherein the liquid coating composition is cured by heat activation at a maximum substrate temperature of 240° C.

14. A non-aqueous liquid coating composition that can cure by heat activation, said non-aqueous liquid coating composition comprising:

a polyfunctional resin, a fatty acid derivative that is an acyl-group containing monofunctional or polyfunctional alkyl esters, a catalyst, optionally a curing agent and optionally one or more additives, wherein the polyfunctional resin comprises functional groups that react with acyl groups of the fatty acid derivative.

15. The coating composition of claim 14, wherein the polyfunctional resin is an alkyd, polyester, polyacrylate, polymethacrylate, phenolic or amino resin.

16. The coating composition according to claim 15, wherein the curing agent is an epoxy functional compound, a phenolic functional crosslinker, a hydroxyl functional crosslinker, an amine functional crosslinker, a carboxylate functional crosslinker, or an isocyanate functional crosslinker.

17. The coating composition according to claim 16, wherein the curing agent is (1) an amino compound that is hexamethoxymethylmelamine, or (2) an epoxyfunctional compound that is bisphenol-A-diglycidyl ether or triglycidyl-isocyanurate.

18. The coating composition according to claim 14, wherein the curing agent is an epoxy functional compound, a phenolic functional crosslinker, a hydroxyl functional crosslinker, an amine functional crosslinker, a carboxylate functional crosslinker, or an isocyanate functional crosslinker.

19. The coating composition according to claim 18, wherein the curing agent is (1) an amino compound that is hexamethoxymethylmelamine, or (2) an epoxy functional compound that is bisphenol-A-diglycidyl ether or triglycidyl-isocyanurate.

20. The coating composition according to claim 14, wherein the fatty acid derivative has a carbon chain length of not more than 22 carbon atoms.

21. The coating composition according to claim 14, wherein the fatty acid derivative is (1) a monofunctional alkyl ester that is methyl, or (2) a polyfunctional alkyl ester that is glycerol ester.

22. The coating composition according to claim 14, capable of being cured thermally at a temperature of 200° C. to 300° C. and for a time of 37 seconds to 5 minutes.

23. The coating composition according to claim 14, capable of being cured thermally at a maximum substrate temperature of 240° C.

* * * * *